Nov. 22, 1938.  J. A. ALVAREZ  2,137,662

HYDRAULIC SUSPENSION FOR MOTOR VEHICLES

Filed Oct. 26, 1937  5 Sheets-Sheet 1

Inventor
J. A. Alvarez
By Watson E. Coleman
Attorney

Nov. 22, 1938.    J. A. ALVAREZ    2,137,662
HYDRAULIC SUSPENSION FOR MOTOR VEHICLES
Filed Oct. 26, 1937    5 Sheets-Sheet 2

Inventor
J. A. Alvarez
By Watson E. Coleman
Attorney

Nov. 22, 1938.   J. A. ALVAREZ   2,137,662
HYDRAULIC SUSPENSION FOR MOTOR VEHICLES
Filed Oct. 26, 1937   5 Sheets-Sheet 4

Inventor
J. A. Alvarez
By Watson E. Coleman
Attorney

Nov. 22, 1938.  J. A. ALVAREZ  2,137,662
HYDRAULIC SUSPENSION FOR MOTOR VEHICLES
Filed Oct. 26, 1937  5 Sheets-Sheet 5

Inventor
J. A. Alvarez
By Watson E. Coleman
Attorney

Patented Nov. 22, 1938

2,137,662

UNITED STATES PATENT OFFICE 2,137,662

HYDRAULIC SUSPENSION FOR MOTOR VEHICLES

Juan A. Alvarez, Habana, Cuba

Application October 26, 1937, Serial No. 171,154

12 Claims. (Cl. 267—15)

This invention relates to shock controlling and eliminating mechanism for motor vehicles and pertains particularly to an improved hydraulic mechanism involving a novel principle of operation.

A primary object of the invention is to provide a shock controlling mechanism for motor vehicles in which the force or power developed as a result of the application of shock to a wheel in striking an inequality in a road is made use of to control rebound and prevent the chassis of the vehicle being affected or moved to any material extent out of its normal plane of travel.

Another object of the invention is to provide a novel mechanism of the above-described character which will employ the shocks imparted to a motor vehicle wheel to cause the wheel to rise and fall beneath the vehicle chassis without transmitting such movement to the chassis and thereby maintaining the vehicle chassis and body supported by the same in a substantially constant plane of travel.

Another object of the invention is to provide in a mechanism of the character described a novel fluid bypass controlling valve which, under certain conditions of operation, is shifted by the force applied to the mechanism through the connecting medium between the mechanism mounted upon the vehicle chassis and the axle of an adjacent supporting wheel.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

Referring more particularly to the invention, the description will first be confined to the structure of the mechanism and thereafter a description of the operation given.

Figure 1:
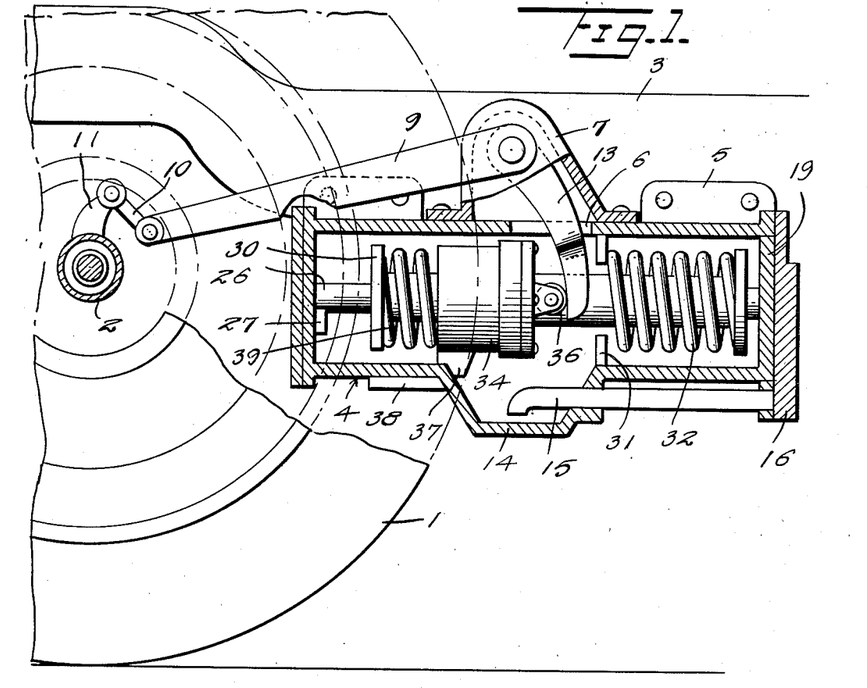
Figure 1 is a view illustrating the application of the mechanism to a motor vehicle, the mechanism being shown partly in longitudinal section and partly in side elevation.

In Fig. 1, the numeral 1 indicates a portion of a motor vehicle wheel, the axle housing associated therewith being indicated by the numeral 2, while the adjacent portion of the chassis frame is indicated at 3. The hydraulic suspension or control mechanism consists of an outer housing which is generally indicated at 4, and which constitutes a reservoir for oil or any other suitable fluid which may be used in the device. This housing is relatively long and preferably of circular cross-section and is secured horizontally to the chassis adjacent a wheel, by the upstanding brackets 5. The central portion of the top of the housing has an opening 6 therethrough which is covered by the casing 7 which constitutes a bearing for a stub shaft 8 which is disposed transversely of the housing and which has attached to one end the lever arm 9, the outer or free end of which is coupled by the link 10 with the bracket 11 which is supported upon the adjacent wheel housing 2 or upon the wheel axle if the device is mounted at the front of the vehicle.

At its central portion the casing 7 is suitably formed to receive the collar-like upper portion 12 of the downwardly projecting fork 13. This fork extends through the opening 6 and into the interior of the housing 4. Connection is made between the fork collar 12 and the stub shaft 8 preferably by the use of splines, altho any other suitable means may be employed for connecting these parts together to prevent relative movement.

Figure 2:
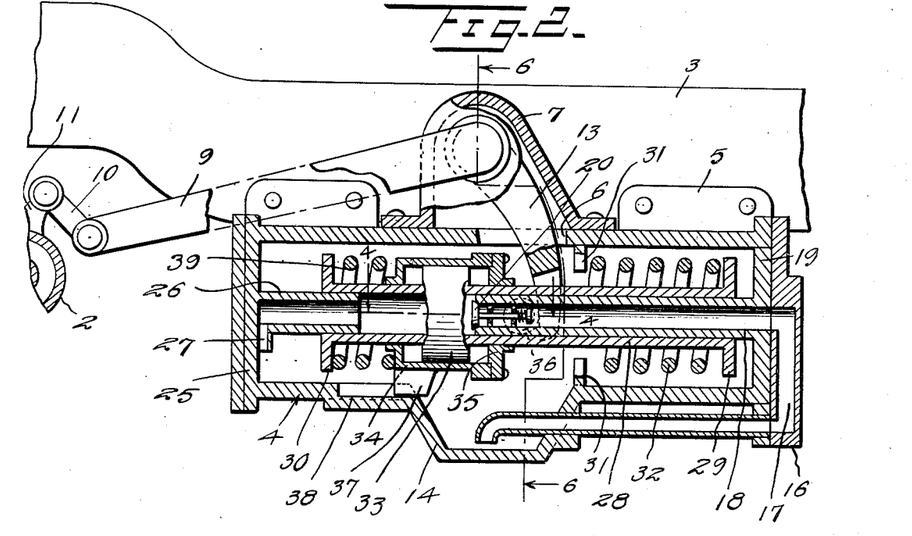
Fig. 2 is a longitudinal sectional view through the entire mechanism with the exception of the piston body therein, showing the position of the parts during normal travel of the vehicle to which the device is attached.
Figure 3:
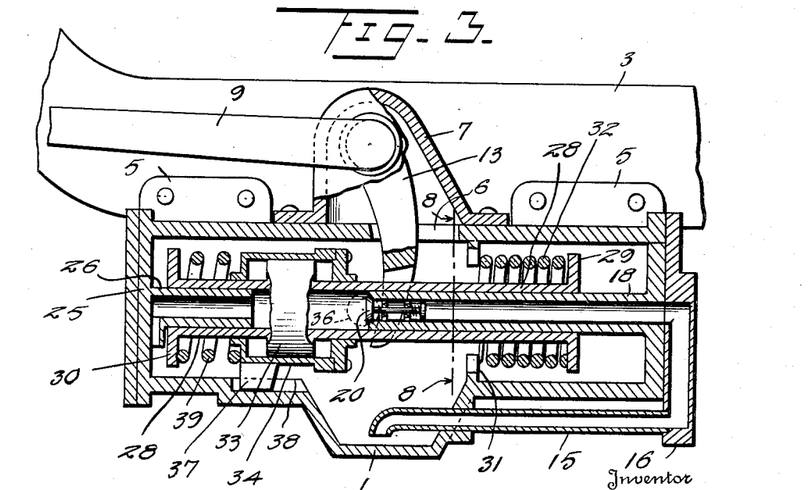
Fig. 3 is a sectional view of the same character as Fig. 2, but illustrating the position of the parts of the mechanism after the application of an upwardly directed shock to the adjacent wheel showing the suspension spring of the mechanism under compression and the mechanism checked.

At the central part of the housing 4 there is a downwardly depressed portion or sump 14 from one side of which there extends the pipe 15 which leads from within the sump to the housing head 16 in which a fluid passageway 17 is formed. This passageway leads, as shown in Figs. 2 and 3, to the longitudinal center of the housing where it communicates with the tubular guide 18 which is formed upon the adjacent end plate 19 of the housing and which extends longitudinally through a portion of the length of the same. At its inner end this tubular guide is maintained closed by the valve disc 20, the stem 21 of which is supported in suitable guides 22. At its inner end the stem of this reciprocating valve 20 has a button 23 between which and the adjacent guide 22 a spring 24 is disposed which, being of the expansion type, normally holds or assists in holding the valve disc 20 upon its seat.

At the opposite end of the housing from the end plate 19 the wall or head 25 has projecting inwardly therefrom upon the longitudinal center of the housing, the short tubular guide 26 which, unlike the guide 18, is open or unobstructed at its outer end and at its end nearest the head 25, communicates with the downwardly directed drain 27 by which fluid may be returned from this guide into the sump 14.

Supported within the housing 4 upon the alined tubular guides 18 and 26, the opposed ends of which are spaced a substantial distance apart, is a slidably mounted tubular cylinder 28. As shown, this cylinder is open at each end and receives the adjacent guides freely therein so that it may be moved back and forth within the housing, and each end of the cylinder is finished off with an outwardly projecting encircling collar, one of which collars is indicated by the numeral 29 and the other by the numeral 30. As shown, this tubular cylinder passes between the ends or tines of the fork 13, the purpose for this arrangement being hereinafter described.

Extending radially inwardly from the side wall of the housing 4 upon the side of the fluid sump 14 nearest the end plate 19, are the abutment ears 31, and encircling the portion of the tubular cylinder between these ears and the flange 29, is a spring 32, hereinafter referred to as the suspension spring.

Between the fork 13 and the flange 30 the tubular cylinder carries the piston body, which is designated as a whole by the numeral 33, and this piston is housed within the short cylinder 34 hereinafter referred to as the controlling cylinder, through which the tubular cylinder passes and the controlling cylinder 34 is free to move longitudinally upon the tubular cylinder 28, but this movement is limited, as will be hereinafter described.

The plate 35 which closes the end of the controlling cylinder nearest the fork 13, carries the two rollers 36 against which the ends or tines of the fork bear, and when the fork is oscillated in one direction these rollers receive the thrust and impart force to the controlling cylinder.

Figures 6, 7, 8:
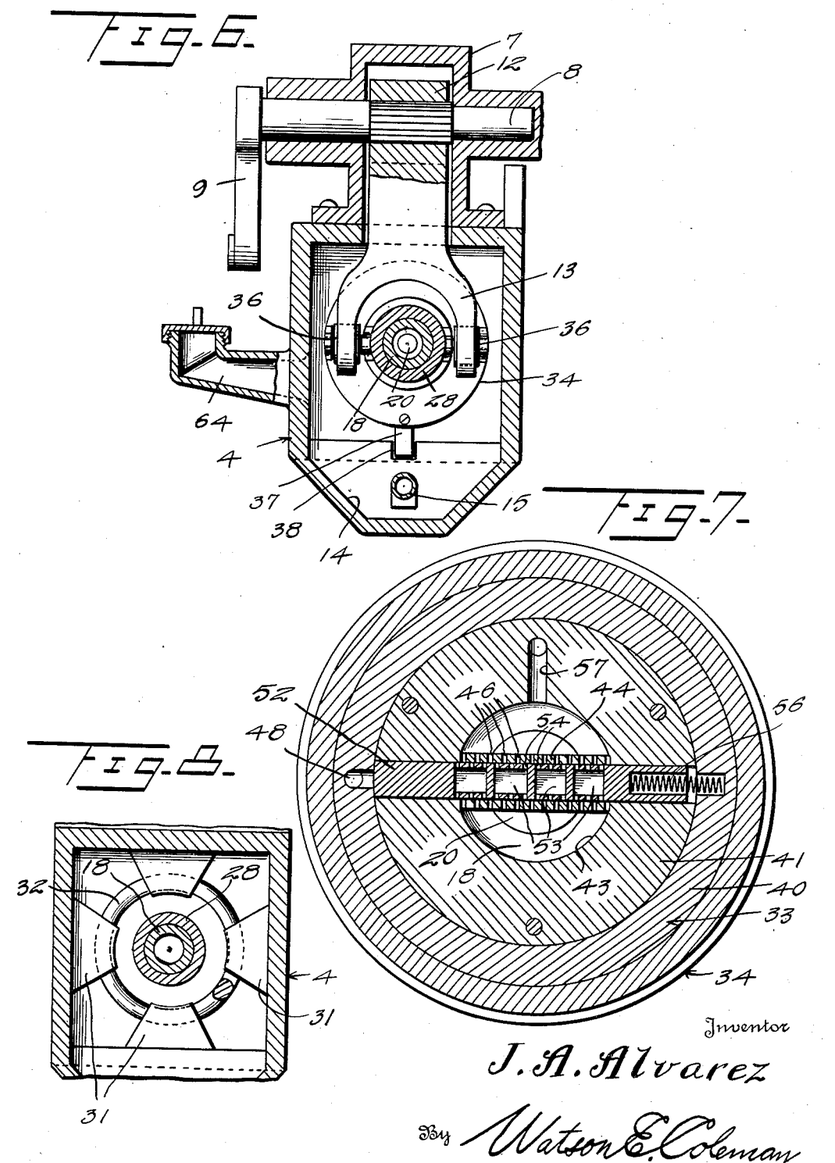
Fig. 6 is a vertical transverse section taken on the line 6—6 of Fig. 2.
Fig. 7 is a section taken on the line 7—7 of Fig. 5.
Fig. 8 is a section taken on the line 8—8 of Fig. 3.

Formed integrally with the controlling cylinder 34 is the downwardly extending guide fin 37 which engages in a guide groove 38 formed in the underlying wall of the housing 4. This fin and groove assembly maintains the controlling and tubular cylinders in proper position so as to insure the proper engagement of the ends of the fork 13 with the rollers 36.

Interposed between the controlling cylinder 34 and the flange 30 is a spring 39 hereinafter referred to as the controlling spring. This spring co-operates with the piston 33 permitting the latter to "float" or oscillate in the control cylinder 34 in the operation of the device as hereinafter more specifically set forth.

Figure 4:
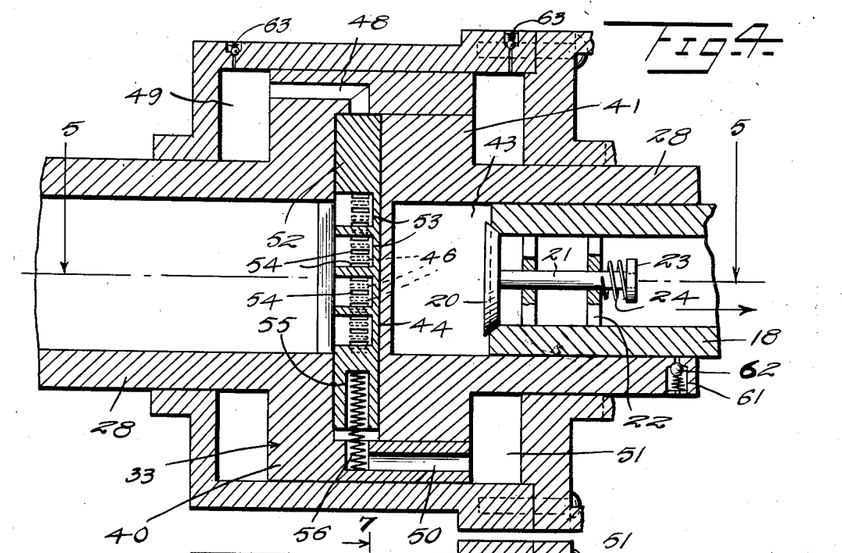
Fig. 4 is a sectional view taken on the line 4—4 of Fig. 2 which extends only through the piston and immediate adjacent parts.
Figure 5:
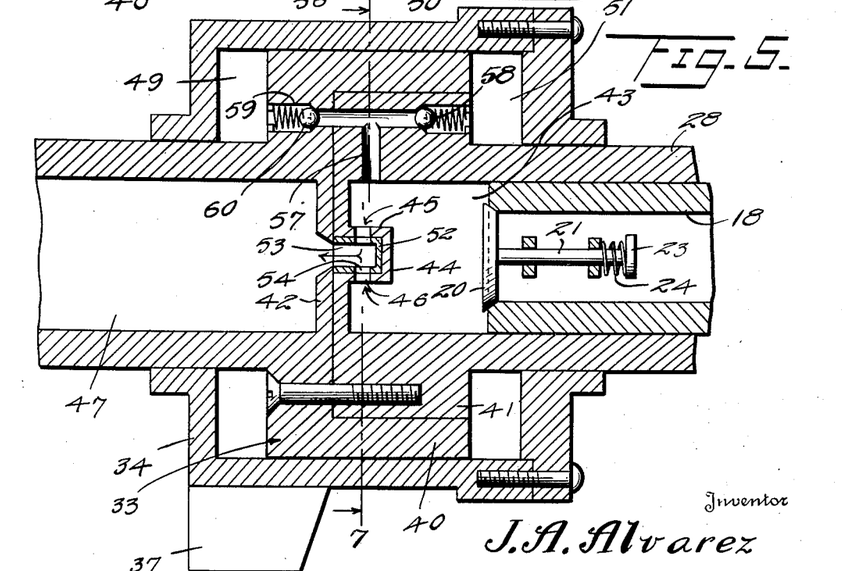
Fig. 5 is a sectional view taken on the line 5—5 of Fig. 4.

As illustrated in Figs. 4 and 5, the piston 33 is formed in two parts, the outer part being indicated by the numeral 40 and the inserted part by the numeral 41. This construction is provided for ease of assembly and in the further description of the structure, the piston will be considered as being of solid form with a wall 42 formed in the center part thereof and dividing the tubular cylinder 28. This division wall 42 forms a fluid chamber 43, one side of which is closed by the valved end of the tubular guide 18. Upon the side of the wall 42 which faces into the chamber 43, a channeled guide 44 is formed which has side walls 45 provided with a series of fluid passing apertures 46. This channeled guide opens toward the opened end of the tubular guide 26 or into the area which is indicated by the numeral 47. As shown in Fig. 4, the channeled guide 44 extends beyond the interior walls of the tubular cylinder and into the body of the piston. At one end this extended portion of the channeled guide opens into the fluid passage 48 which extends to the area 49 between the piston and one end wall of the controlling cylinder while at its opposite end the channeled guide 44 opens into the oppositely extending passage 50 which leads to the opposite side of the piston from the passage 48 and into the area 51.

Figure 11:
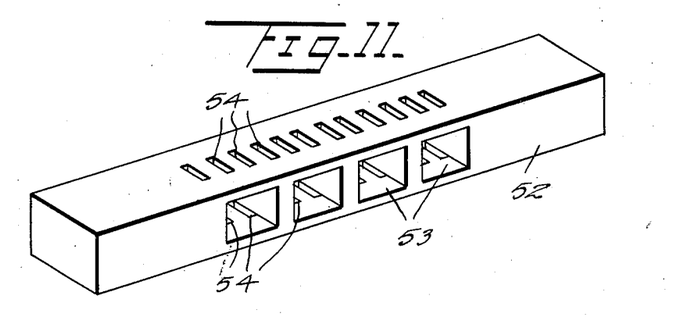
Fig. 11 is a perspective view of a sliding valve unit of the mechanism.

Disposed within the channeled guide 44 is a sliding valve 52, the overall length of which is slightly less than the overall length of the channeled guide 44 so that this slide may have limited longitudinal movement in the guide. In the area of the slide valve extending longitudinally thereof and between the opposite sides of the inner walls of the tubular cylinder 28, is a series of pockets 53 which open in the direction of the chamber 47 and the side walls of these pockets are provided with the slots 54 which are spaced so that in one position of the slide valve they will be brought into registry with the apertures 46 formed in the sides of the channeled guide 44 and thus provide a means for fluid to pass from the chamber 43 into the chamber 47. While the valve 52 has been illustrated and described as having the pockets 53 in the side facing into the chamber 47, it will, of course, be understood that this may be an entirely open area instead of being separated by the partitions which form the area into the pockets referred to.

At the end of the slide valve 52 nearest the passage 50 which leads into the control cylinder area 51, the valve is provided with a socket 55 in which is housed an end of an expansion spring 56, the other end of which bears against the opposite wall of the passage 50, and this spring normally maintains the slide valve in position in the guide 44 where the apertures 46 and 54 will be out of registry and therefore the fluid passageway between the chambers 43 and 47 will be maintained closed.

The numeral 57 designates a fluid supply passageway leading from the chamber or fluid area 43 to the opposite directed outlets 58 and 59. These outlets as shown in Fig. 5, open through the opposite faces of the piston and respectively into the areas 51 and 49. Each of the outlets is normally closed by the spring-pressed ball check 60. When movement of the unit occurs with respect to the tubular guide 18 fluid will be injected from the chamber 43 into the chambers 49 and 51 to fill or replenish the same when necessary.

The numeral 61 designates a passage formed through the wall of the tubular cylinder 28, which passage is normally covered or closed at its inner end by the tubular guide 18. This passage is kept closed at its outer end by the outwardly opening ball check valve 62 and is provided in the tubular or reciprocating cylinder 28 to afford an auxiliary opening to the chamber 43 so as to allow fluid to escape under certain conditions of operation to prevent the suspension spring 32 from being over-compressed as a result of the application of successive and violent shocks to the mechanism.

Upon the two sides of the piston 33, the side wall of the cylinder 34 is provided with an outwardly opening valve controlled passage 63. These passages are provided to prevent air from entering the chambers 49 and 51 and permit any air which may have gotten into the chambers with the fluid to be expelled. These passages also permit the fluid to pass out of the chambers 43, and 49 and 51, when the vehicle is not running, and should the suspension spring 32 be held or checked under compressed condition the provision of these apertures allows it to be released in a short period of time.

In order that fluid may be conveniently introduced into the system, one side of the housing 4 is provided with the inlet nozzle 64, shown in Fig. 6.

Figure 9:
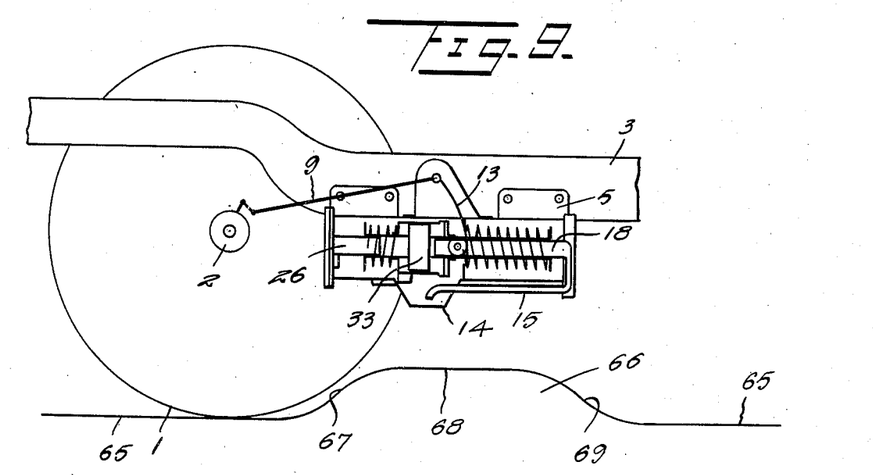
Fig. 9 is a view illustrating diagrammatically the position of the mechanism parts during normal travel and prior to the impingement of the adjacent wheel against an obstruction.

In describing the operation of the mechanism, reference will be made principally to Figs. 9 and 10. In these figures, the numeral 65 designates the normal road surface line and the numeral 66 indicates an obstruction or bump in the road. The normal position of the parts of the mechanism is as illustrated in Figs. 2 and 9 wherein it will be seen that the lever 9 is directed downwardly and the suspension spring 32 is fully expanded. As the vehicle wheel travels along the normal surface of the road the pressures within the two chambers 49 and 51 which are filled with the operating fluid, are equal, but when the fork 13 pushes against the rollers 16 carried by the controlling cylinder 34 as a result of the application of shock to the wheel 1, as for example, when the wheel strikes against the inclined surface 67 of the obstruction 66, the fluid contained in the chamber 51 acts as a block or obstructing medium to prevent the relative movement of the cylinder 34 and piston 33. This transmits thrust from the fork to the piston 33 and since the piston is fixed to the tubular cylinder 28 the entire group of parts made up of the cylinder 28, the cylinder 34, and spring 39, will be forced in the direction of the housing end plate 25 and this action will increase the pressure within the chamber 51 and decrease the pressure to a certain extent in chamber 49, thus properly assisting the spring 56 in forcing the sliding valve 52 to closed position.

Since the piston and the tubular and controlling cylinders move away from the valved end of the tubular guide 18 during this operation, it will be apparent that pressure within the chamber 43 will be reduced so that additional fluid will be drawn from the sump 14 thru the passage 17. As the movement of the unit toward the housing end plate 25 has caused this fluid to be drawn into the chamber 43, and inasmuch as the sliding valve 52 is closed, the entire unit will be held or checked in the extreme position to which it has been moved under the force applied thereto through the fork 13. This action of the unit results in the compression of the spring 32. As soon as a unit has reached the limit of its movement during this thrust of the fork 13, the pressures within the chambers 49 and 51 will become equalized and since the suspension spring 32 has become fully checked or held, there has been no jolt or jar transmitted to the chassis and the chassis will be maintained at the level in which it is shown in the two Figs. 9 and 10.

The numeral 68 indicates the portion of the road surface along which the suspension spring is kept fully compressed or checked, that is, the force generated by the shock applied when the wheel encounters the part 67 of the road surface, is retained in the suspension spring during the travel of the wheel over this raised area. This constitutes what might be termed the first cycle of operation of the mechanism.

Figure 10:
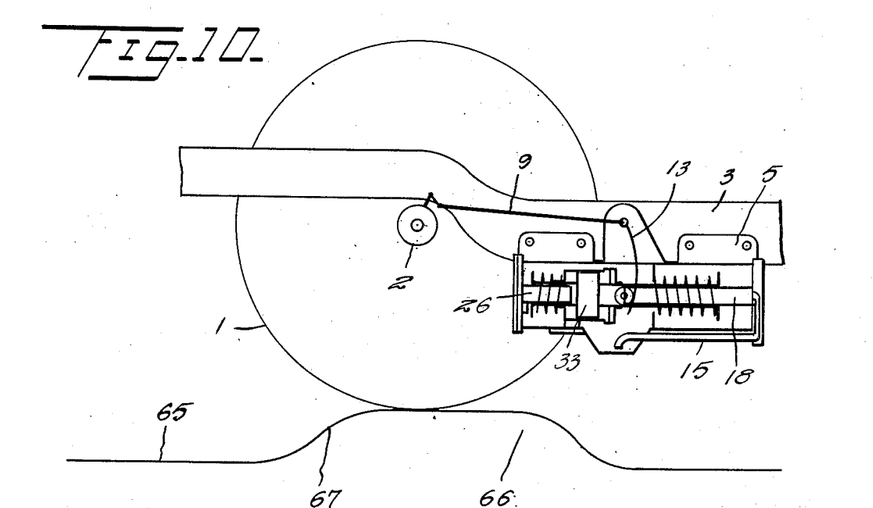
Fig. 10 is a view illustrating diagrammatically the relative positions of the wheel and chassis after the wheel has struck the obstruction and showing the changed positions of the parts of the mechanism.

The second operation takes place along the area 68 of the road and consists in keeping the reciprocating unit, by which is meant the two cylinders 28 and 34 with the piston and spring 39, in the position in which it is shown in Figs. 3 and 10. The pressure within the areas 49 and 51 remains equal during this period.

The third operation or movement of the mechanism occurs as the wheel reaches the far side of the road obstruction and begins to drop along the area 69. As soon as the wheel begins to move down the fork 13 moves in the direction to release the cylinder 34. It will thus be seen that the slightest movement of the fork away from the cylinder 34 will reduce the intensity of the pressure against the cylinder and will permit the controlling spring 39 to exert slight pressure against the cylinder 34 so as to force the same forwardly with respect to the piston 33. This movement will increase slightly the pressure within the fluid chamber 49 and also decrease to the same extent the pressure within the cylinder 51 thereby forcing some of the fluid into the passage 48 and against the adjacent end of the slide valve 52 to move the valve to a position where the apertures 46 and 54 will come into registry thus allowing the fluid to pass from the chamber 43 through these passages as indicated by the arrows in Fig. 5, into the chamber 47. From this chamber the fluid passes back to the sump by way of the tubular guide 26 and the discharging outlet 27. As soon as the fluid is permitted to pass from the chamber 43 the unit will move as a whole in the direction of the end 19 of the housing under the force exerted by the reaction of the compressed suspension spring 32. Altho the slide valve 52 has opened, the volume of oil remaining in the chamber 43 is such that it will maintain a checking influence upon the cylinder 34 and the piston 33 and therefore the fluid will counteract the thrust of the suspension spring 32 to cause the parts of the unit to move back at the proper speed so that the wheel will be restored to the normal road surface level from the level to which it was moved in passing over the obstruction 66. This moving back speed of the fork 13 in the direction of expansion of the spring 32 is synchronous with the speed of movement of the cylinder 28 and the volume of fluid passing thru the sliding valve must be such as to permit the suspension spring to be released at a speed to allow it to exert its force upon the lever 9 through the fork 13 so as to sustain the chassis of the vehicle at the normal level in which it is illustrated in the figures.

The suspension units form the sole connection between the chassis frame of the motor vehicle and the axles extending therebeneath and therefore it will be readily apparent that the weight of the car body and chassis is transmitted through the movable unit within the cylinder 4 between the cylinder and chassis and the fork 13 which is coupled with an axle. The two springs will therefore normally be under tension imposed by the weight of the vehicle and the chassis, and when this weight is added to as by a person or several persons stepping into the vehicle, the tension of the suspension spring and the controlling spring is increased. This will cause the piston 33 to move with respect to the cylinder 34 so that the chamber 51 will be slightly reduced in capacity and the opposing chamber 49 will be enlarged. The pressure created by the reduction of the capacity of the chamber 51 will cause some of the fluid in the cylinder to be ejected thru that relief valve 63 which communicates with the chamber 51, and the slight vacuum created in the chamber 49 by this movement of the piston will cause fluid to be drawn from the chamber 43 through the passage 57 by way of the valve 59. It is here to be pointed out that this very slight or barely perceptible vacuum created in the controlling chambers 49 and 51 as weight is added to or taken from the chassis, only occurs when the car is stopped and the weight varies, as stated, but when the car is running and the unit reciprocates as a result of upward and downward movements of the wheel connected therewith, the mechanism operates as a pump and fluid is injected from the chamber 43 to the chambers 49 and 51. With the addition of weight to the vehicle so that pressure in the chamber 51 is increased slightly as above stated, the equilibrium of pressure in the two chambers is only broken momentarily as only a few seconds are required to allow the piston to assume a new position where the pressures in the chambers 49 and 51 will again become balanced, this balanced condition being brought about by the new tension applied to the springs.

The controlling spring 39 is made use of for the purpose of maintaining the pressure in the two chambers 49 and 51 balanced and to produce variations in the intensity of the pressures in these chambers, in the operation of the unit, to impart opening and closing action to the slide valve 52. The result of this arrangement of the control spring 39 with respect to the other parts, is such that the action of the slide valve becomes very sensitive so that the least force exerted against either of the ends of the cylinder 34 causes this valve to operate especially when its closing stroke takes place as its movement is then accelerated by the spring 56. As a result the slightest force exerted by the spring 39 against the cylinder 34, when the intensity of the thrust contact of the fork 13 against the cylinder 34 becomes somewhat weaker as a result of a tendency of the fork to go back at a speed greater than the speed of movement of the unit, is capable of causing the valve to move to opened position so that the movement of the unit will be constant with the moving of the fork.

While the valved apertures 63 allow movements in the piston with respect to the cylinder, when the weight of the chassis is increased or decreased and such movement requires only a few seconds, these movements are not possible in the case of the application of shocks to the vehicle wheels, as such movements are too fast to permit any appreciable amount of fluid to pass out of the apertured passages.

By the provision of the valved outlet 62 in the cylinder 28, relief is provided for pressure which might be developed under certain conditions in the chamber 43. However, this valve only operates to relieve pressure in the chamber 43 when, as a result of excessive weight on the chassis or successive violent shocks being sustained by the wheels, the suspension spring 32 becomes excessively or over-compressed. If such over-compression should occur just prior to the stopping of the vehicle, release of the pressure within the chamber 43 would not be had without the provision of this valved aperture 62 but, as will be apparent, as soon as the aperture arrives at the end of the fixed piston or guide 18 it becomes free to open, thus releasing the pressure in the chamber referred to.

To allow the force taken up by the suspension spring to sustain the chassis at the proper travel level, after the wheel has struck an obstruction in the manner described and while the wheel is passing down upon the opposite side of the obstruction, it is necessary for the moving unit to return to normal position at the same speed as the fork and lever 9. This effect is obtained by regulating the passage of the fluid from the chamber 43 through the openings of the sliding valve 52 and the channeled guide in which it moves, and this control is accomplished by increasing or decreasing the pressures in the chambers 49 and 51 as a result of the thrust contact between the fork and the cylinder 34. For example, if the wheel moves down too rapidly from the top of the obstruction and the sliding valve has not opened sufficiently, the speed at which the fork 13 moves back to its normal position would be greater than the return speed of the unit because the cylinder 28 has not been released sufficiently and the intensity of the thrust contact between the cylinder 34 and the fork would become weaker and cause the auxiliary spring to push the cylinder 34 in the direction in which the unit is moving. As the cylinder 28 and the piston 33 are the parts of the returning unit which are directly under the restraining or checking action of the fluid in the chamber 43, the cylinder 34 would be forced to move very slightly with respect to the piston, with the result that the increased pressure in the chamber 49 will cause the sliding valve to move further toward the fully opened position and allow the passage of the fluid from the chamber 43 into the chamber 47 to take place with greater speed and thus permit the unit as a whole to increase the speed of its movement back to normal position and therefore become synchronous with the movement of the fork and lever.

If the sliding valve should have been opened to an extent to allow a greater volume of fluid to pass from the chamber 43 than is required to meet the conditions, it will be apparent that the cylinder 28 will be tempted to move faster than the fork 13 and then the intensity of the thrust contact existing between the cylinder 34 and the fork becomes somewhat greater, causing the piston to have a slight movement relative to the cylinder 34 in the direction in which the unit is traveling, thus bringing about an increased pressure in the chamber 51 and a decreased pressure in the chamber 49. This increased pressure in the chamber 51 will be transmitted to the sliding valve through the passage 50 and cause the valve to partially close so as to reduce the volume of fluid passing through its openings and thereby cut down the speed of movement of the unit.

The three cycle operation described is repeated through all irregularities of road surface, with the result that the chassis of the vehicle is kept at exactly the same level or height above the road surface at all times.

While the description of the operation of the present hydraulic suspension has been confined to an explanation of the action of the device when shocks are imparted to the vehicle wheels by raised obstructions in the roadway, it is believed that the operation of the mechanism when the wheel strikes a depression in the roadway after running along a flat surface, will be readily apparent. When this occurs, if the suspension spring 32 is not over-compressed or is in the normal condition illustrated in Fig. 2, the chassis will descend to adapt itself to the new level of the road surface. On account of the long dimensions of the spring 32, this descent of the chassis is permitted to take place smoothly or gently but when the wheel contacts the high side of the depression into which it is dropped, the spring 32 will be overcompressed or placed under a tension greater than normal and the device will then operate in the same manner as described previously in connection with the action occurring when the wheel of the vehicle strikes a raised place or obstruction in the road. In other words, the chassis will be maintained at the level or plane to which it has been lowered by the use of the force generated by the shock applied to the wheel as it rides over the high side of the depression. If a roadway becomes a series of hollows or depressions, then the action of the mechanism is the same as it would be on a roadway where a series of raised places or bumps are encountered for, as would be readily recognized, either case constitutes merely a series of successive elevations and depressions.

I claim:

1. Mechanism of the character described for connection between a vehicle wheel axle and overlying chassis, comprising a housing attached to the chassis, a lever pivotally attached at one end to said axle, a pivotal connection between the lever adjacent its other end and the housing, the said other end constituting a thrust finger extending into the housing, a fluid in the housing, a unit shiftably mounted in the housing and comprising two relatively movable elements, said finger engaging one of the elements to force the unit in one direction upon oscillation of the lever, said unit elements being hollow to receive fluid from the housing, fluid transfer means between the elements, resilient means placed under tension upon shifting of the unit in one direction by the finger, means permitting circulation of fluid from the housing thru the unit and back to the housing, and means operating automatically to close the fluid transfer means when the unit is moved by the thrust of said finger in a direction to tension said resilient means and to open said transfer means when the pressure of said thrust is relieved.

2. Mechanism of the character described for connection between a vehicle wheel axle and overlying chassis, comprising a fluid reservoir attached to the chassis, alined tubular guides in and in communication with the reservoir, a tubular cylinder having its ends slidably receiving opposed ends of said guides, one guide constituting a fluid inlet for the cylinder and the other guide forming an outlet therefor, a fluid filled control cylinder traversed by the first cylinder and longitudinally movable thereon, a piston carried by the first cylinder and fitting centrally in the control cylinder, means for transmitting pressure in one direction to the control cylinder from and upon movement of said axle in one direction relative to the chassis, fluid transfer means from one side of said piston to the other, means operating upon application of said pressure to the control cylinder to close said fluid transfer and cause said cylinders to move as a unit, spring means placed under tension upon said movement of said unit, and reacting means operating to open the fluid transfer upon relief of said pressure and permitting reactance of said tensioned spring to return the said unit to a selected position in the reservoir.

3. In mechanism for maintaining a moving vehicle chassis substantially in the same horizontal plane relative to the vehicle wheels and axles, a lever pivotally coupled with said chassis and having an end pivotally coupled with an axle, a thrust element rigid with the lever, a spring, means effecting tensioning said spring on oscillation of said thrust element in one direction, fluid controlled means for retaining the spring under tension following the movement of the thrust means in the said one direction, and means for releasing the fluid of the fluid controlled means upon the lightening of pressure of the thrust means to release for reaction the tensioned spring.

4. In mechanism for maintaining a moving vehicle chassis substantially in the same horizontal plane relative to the vehicle wheels and axles, a lever pivotally coupled with said chassis and having an end pivotally coupled with an axle, a thrust element rigid with the lever, said lever in moving with the wheel and axle oscillating the thrust element, a movable body having an expansible chamber and adapted to be shifted by a thrust from said element, means acting to enlarge said chamber and to inject a fluid thereinto upon movement of the body by said element, spring means placed under tension simultaneously with and by the said movement of the body, means acting to trap the fluid in said chamber in said movement to prevent retrograde movement of the body under influence of the tensioned spring, and means acting upon the lightening of the force of the thrust element to release said trapped fluid to permit the tensioned spring to effect said retrograde movement of the body.

5. In mechanism for maintaining a moving vehicle chassis substantially in the same horizontal plane relative to the vehicle wheels and axles, a lever pivotally coupled with said chassis and having an end pivotally coupled with an axle, a thrust element rigid with the lever, said lever in moving with the wheel and axle oscillating the thrust element, a movable body having an expansible chamber and adapted to be shifted by a thrust from said element, means acting to enlarge said chamber and to inject a fluid upon movement of the body by said element, spring means placed under tension simultaneously with and by the said movement of the body, means acting to trap the fluid in said chamber in said movement to prevent retrograde movement of the body under influence of the tensioned spring, an outlet for the said enlarged fluid containing chamber, valve means controlling said outlet, and means acting upon a lightening of the force of the thrust of said element to open said valve for the release of the trapped fluid and permitting the tensioned spring to effect the retrograde movement of the body.

6. In mechanism for maintaining a moving vehicle chassis substantially in the same horizontal plane relative to the vehicle wheels and axles, a lever pivotally coupled with said chassis and having an end pivotally coupled with an axle, a thrust element rigid with the lever, said lever in moving with the wheel and axle oscillating the thrust element, a movable body having an expansible chamber and adapted to be shifted by a thrust from said element, a tubular supporting guide for the body constituting a fluid supply line, one end of said guide having an outlet valve therein and also forming a wall of said chamber with relation to which said body is moved, the body when moved under thrust from said member drawing fluid past said valve into the chamber, an outlet for the chamber, a valve controlling the outlet, means operating to maintain said last valve closed upon movement of the body by the thrust member whereby fluid will be drawn and trapped in the chamber, a force-absorbing spring tensioned by and upon the said movement of the body, and means becoming operative upon lightening of the force of said thrust member to effect opening of said last valve to permit escape of the trapped fluid and reactance of said spring to move the body back to an initial position.

7. In mechanism for maintaining a moving vehicle chassis substantially in the same horizontal plane relative to the vehicle wheels and axles, a lever pivotally coupled with said chassis and having an end pivotally coupled with an axle, a thrust element rigid with the lever, said lever in moving with the wheel and axle oscillating the thrust element, a movable body having an expansible chamber and adapted to be shifted by a thrust from said element, a tubular supporting guide for the body constituting a fluid supply line, one end of said guide having an outlet valve therein and also forming a wall of said chamber with relation to which said body is moved, the body when moved under thrust from said member drawing fluid past said valve into the chamber, an outlet for the chamber, a valve controlling the outlet, means operating to maintain said last valve closed upon movement of the body by the thrust member whereby fluid will be drawn and trapped in the chamber, a force-absorbing spring tensioned by and upon the said movement of the body, a normally tensioned resilient element having a reactance force directed in opposition to the force of said thrust member, and means responding to the said force of the resilient element upon lightening of the thrust of said thrust member to open said last valve whereby the escape of the trapped fluid is permitted and said tensioned spring is released.

8. In a mechanism for maintaining a moving vehicle chassis in a constant horizontal plane relatively to an underlying wheel and axle structure, a lever having an end pivotally coupled with an axle, a fluid reservoir secured to the chassis, pivot means between the lever and the said reservoir whereby the lever will rock upon movement of the axle relative to the chassis, a thrust member extending from and rockable with the lever and extending into the reservoir, a pair of spaced alined tubular guides in the reservoir, one of which has a valved outlet end and the other having its end open, a tubular cylinder having the ends of said guides slidably extended into its ends and movable longitudinally on the guides, a piston integral with the cylinder, a cylinder encircling the first cylinder and enclosing the piston, said second cylinder being in fluid-tight connection with the first cylinder and having limited movement thereon, said thrust member engaging the second cylinder to impart pressure thereagainst upon actuation of said lever, said second cylinder containing fluid on both sides of the piston and the piston having an expansible chamber of which the valved end of the fixed guide forms a wall, an outlet for said chamber leading into the other tubular guide, valve means controlling said outlet, fluid passages thru which the fluid upon the two sides of the piston may impose opposing forces against said last valve, a spring arranged to be placed under tension upon movement of the cylinders under force applied by the thrust member, such thrust effecting maintenance of the second valve closed, and means acting upon the lightening of the force of said thrust to urge the second cylinder on the first cylinder in the direction opposed to the force of the thrust member to shift the last valve under fluid pressure to opened position.

9. A hydraulic suspension means for a vehicle for interposition between the vehicle ground engaging structure and the overlying body, comprising a leverage unit having two terminals and having a fulcrum attachment between the terminals with the body, one of said terminals being coupled with said structure, a fluid receptacle secured to said body and having the other one of said terminals extended thereto, a pair of aligned guides in spaced relation in said receptacle, a piston carrying body mounted for sliding movement upon and connecting said guides, a closed fluid containing piston cylinder enclosing said piston and having limited sliding movement on said sliding body, the said other one of said terminals engaging said cylinder, resilient means connected with the sliding body to be placed under tension under thrust movement of said last terminal against said cylinder, means carried by the piston acting to close a fluid by-pass passage through the piston when said thrust movement is made and reacting under fluid pressure to open the passage upon reverse movement of the piston, means acting to impart said reverse movement upon lightening of said thrust, and means for supplying fluid to the cylinder from the receptacle.

10. A hydraulic suspension means for interposition between a motor vehicle chassis and the supporting wheels and axles therefor, comprising a lever pivotally coupled with the chassis and having an end pivotally connected with an axle, a thrust finger coupled with the lever to be moved thereby upon relative movement of the chassis and axle, a movable unit mounted to be shifted by said finger upon approaching movement of the vehicle chassis and axle, said unit including a cylinder and a piston movable therein, means for injecting fluid into the cylinder on both sides of the piston, there being a fluid passageway from one side of the piston to the other, a spring coupled with the unit and tensioned simultaneously with the movement of the unit by the finger, said unit movement compressing the fluid on one side of the piston, shiftable valve means in said passage which is moved to close the passage by and upon the stated compression of the fluid, and means acting upon the lightening of the thrust of the finger upon the unit to effect compression of the fluid upon the other side of the piston and the shifting of said valve thereby to passage open position.

11. A hydraulic suspension means for interposition between a vehicle chassis and the supporting wheels and axles therefor, comprising a lever pivotally coupled with the chassis and having an end pivotally connected with an axle, a thrust finger coupled with the lever to be moved thereby upon relative movement of the chassis and axle, a pair of aligned guides supported in spaced relation by the chassis, a tubular body receiving said guides in its ends and supported thereby, a piston integral with the body and including a web portion partitioning the body and having a fluid opening therethrough, a cylinder traversed by and movable in the body and having the piston centrally therein to form two fluid filled chambers, means for conveying fluid into the tubular body upon one side of said web and thence to both chambers, said finger engaging said cylinder to impart pressure thereagainst upon a predetermined movement of the lever whereby the fluid in one chamber is compressed and the body and cylinder are moved together, spring means connected with the cylinder and tensioned upon movement of the same by the finger, an apertured slide valve carried by the piston to move across said web in operative relation with the fluid opening in the web, means for transmitting fluid pressure to opposite sides of said valve from said chambers whereby the valve may be alternately shifted by alternation of chamber pressures to opened and closed positions, the fluid compressed in one chamber by imposition of pressure to the cylinder acting to close the valve, and means acting upon lightening of said pressure to establish pressure in the other chamber which acts to shift the valve to open position.

12. A hydraulic suspension for interposition between a vehicle chassis and the supporting wheels and axles therefor, comprising a lever pivotally coupled with the chassis and having an end pivotally connected with an axle, a thrust finger coupled with the lever to be moved thereby upon relative movement of the chassis and axles, a pair of elongated aligned guides carried by the chassis in spaced relation, a tubular cylinder having the guides extended into its ends and slidable on the guides, a collar about each end of the cylinder, means for introducing fluid into said cylinder in the space between the ends of the guides, a piston carried by the cylinder, a web dividing said fluid space and lying in the area between the faces of the piston, a closed cylinder traversed by the first cylinder and having said piston positioned therein to form a fluid chamber on each side of the piston, valve means permitting flow of fluid from one side of the web to the other, the said finger engaging the closed cylinder to impart thrust thereto on movement of the lever in one direction, said thrust of the finger effecting the compression of the fluid in one chamber and shifting both cylinders together, a spring encircling the first cylinder and having one end engaging a collar, fixed means engaged by the other end of the spring, said spring being compressed upon the said movement of both cylinders, means whereby the compression of fluid in the said one cylinder will close said valve, means whereby compression of the fluid in the other chamber will open said valve, and an expansion spring encircling the first cylinder and engaging between the other collar and the closed cylinder to effect compression of the fluid in the other chamber upon the lightening of the fluid compression in the first cylinder.

JUAN A. ALVAREZ.